(12) United States Patent
Park et al.

(10) Patent No.: US 8,397,095 B2
(45) Date of Patent: Mar. 12, 2013

(54) METHOD AND APPARATUS FOR SYNCHRONIZING TIME OF DAY OF TERMINAL IN CONVERGENT NETWORK

(75) Inventors: Dae Geun Park, Daejeon (KR); Jung Hee Lee, Daejeon (KR); Seung Woo Lee, Daejeon (KR); Bhum Cheol Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 515 days.

(21) Appl. No.: 12/575,375

(22) Filed: Oct. 7, 2009

(65) Prior Publication Data

US 2010/0086091 A1 Apr. 8, 2010

(30) Foreign Application Priority Data

Oct. 8, 2008 (KR) .......................... 10-2008-0098786

(51) Int. Cl.
*G06F 1/12* (2006.01)
*G06F 13/42* (2006.01)

(52) U.S. Cl. ........................................ 713/400; 713/401
(58) Field of Classification Search .................. 713/400, 713/401
See application file for complete search history.

(56) References Cited

U.S. PATENT DOCUMENTS

| 6,023,769 | A * | 2/2000 | Gonzalez | 713/400 |
| 6,980,232 | B2 * | 12/2005 | Suzuki | 348/207.1 |
| 7,376,050 | B2 * | 5/2008 | Yanase | 368/10 |
| 2004/0213367 | A1 * | 10/2004 | Han | 375/354 |

FOREIGN PATENT DOCUMENTS

| JP | 2006-322788 | 11/2006 |
| JP | 2007-124029 | 5/2007 |
| KR | 1020040056981 | 7/2004 |
| KR | 1020080080758 | 9/2008 |

* cited by examiner

*Primary Examiner* — Tim T Vo
*Assistant Examiner* — Jeremy S Cerullo
(74) *Attorney, Agent, or Firm* — Blakely, Sokoloff, Taylor & Zafman

(57) ABSTRACT

Provided is a method and apparatus for synchronizing a time of day (TOD) in a convergent network, wherein the TOD is received from a time server connected in the convergent network and is provided to a terminal connected in a wired or wireless network, specifically a terminal connected in a heterogeneous network, that requires TOD information. The apparatus includes a time server that provides standard TOD information, a gateway or a host personal computer (PC) that provides the standard TOD information of the time server to the terminal in a 3rd layer or lower instead of an upper layer of the open system interconnection (OSI) 7 layer model, and the terminal that adjusts a local clock according to the provided standard TOD information. According to the method and apparatus, the terminal not only maintains a very precise TOD by obtaining TOD information of the time server periodically or when required, but also obtains the TOD information without using application software for processing the TOD information. Accordingly, power consumption of the terminal is decreased.

19 Claims, 14 Drawing Sheets

METHOD AND APPARATUS FOR SYNCHRONIZING TIME OF DAY OF TERMINAL IN CONVERGENT NETWORK

CROSS-REFERENCE TO RELATED PATENT APPLICATION

This application claims the benefit of Korean Patent Application No. 10-2008-0098786, filed on Oct. 8, 2008, in the Korean Intellectual Property Office, the disclosure of which is incorporated herein in its entirety by reference.

BACKGROUND OF THE INVENTION

1. Field of the Invention

The present invention relates to a method and apparatus for synchronizing a time of day (TOD) of a terminal in a convergent network, and more particularly, to a method and apparatus for synchronizing the TOD, which adjusts synchronization between a time server and a terminal based on TOD information provided by a standard time server connected in a network.

2. Description of the Related Art

Terminals, such as computers, connected to a network include an internal clock, and maintain and manage TOD information.

The TOD information of the terminals may be different from actual time due to precision issues of the internal clock.

Accordingly, for the terminals to provide services at a common TOD in a network system, each terminal needs to quickly correct a time difference and synchronize the TOD.

A network time protocol (NTP) or a precision time protocol (PTP) is the basis for synchronizing the TOD over the Internet, and is a protocol for obtaining TOD information.

A terminal synchronizes the TOD by requesting the TOD from a TOD server that provides a standard time or from an NTP server, and by receiving a response signal from the TOD server or the NTP server.

Conventionally, TOD information provided from the NTP server or the TOD server to the terminal is included in general data.

FIG. 1 is a diagram illustrating a structure for synchronizing the TOD of a terminal 130 and a TOD server (or an NTP server) 100 connected in a conventional heterogeneous network.

A TOD gateway 120 is disposed between the TOD server 100 and the terminal 130, and converts data including TOD information to a data frame form according to characteristics of the terminal 130.

Functions of the TOD gateway 120 may be performed by a host PC.

The TOD gateway 120 converts the data including the TOD information received through an Ethernet or internet protocol (IP) network 110 to a data frame form so as to be recognized by the terminal 130.

The converting of the data performed by the TOD gateway 120 is performed in an open systems interconnection (OSI) 7th layer or a lower layer, and the data converted to the data frame form according to the characteristics of the terminal 130 is transmitted to the terminal 130 with the TOD information.

Upon receiving the data frame including the TOD information, the terminal 130 synchronizes the TOD by processing the TOD information using application software installed in the terminal 130.

Accordingly, throughput of a processor of the terminal 130 increases due to the processing of the application software, and an error may occur due to delay in processing the data frame.

When the throughput of the terminal 130 increases, a structure of the terminal 130 becomes complex and a cost of the terminal 130 also increases.

SUMMARY OF THE INVENTION

The present invention provides a method and apparatus for simply and accurately synchronizing a time of day (TOD) between a time server and a terminal while decreasing an operation load of the terminal by enabling a gateway or host personal computer (PC) to perform a TOD information processing function that would normally be performed in the terminal.

According to an aspect of the present invention, there is provided a method of synchronizing a TOD of a terminal in a convergent network, the method including: registering and storing identification information and TOD information of a terminal; obtaining a first path delay time caused by a TOD synchronization message transmission path between the terminal and a TOD synchronization adjusting and storage unit that adjusts TOD synchronization of the terminal, and registers and stores the identification information and the TOD information; obtaining a second path delay time caused by a TOD synchronization message transmission path between the TOD synchronization adjusting and storage unit and a time server providing a standard time; obtaining delay compensated TOD information by applying the first path delay time and the second path delay time to the standard time; converting the delay compensated TOD information to a form of TOD information of the terminal; and transmitting the converted delay compensated TOD information to the terminal.

The method, when a plurality of terminals are connected to the TOD synchronization adjusting and storage unit, may further include: selecting one of the plurality of terminals; and multicasting and transmitting the delay compensated TOD information to the plurality of terminals.

In the transmitting of the converted delay compensated TOD information, the converted delay compensated TOD information may be transmitted from the TOD synchronization adjusting and storage unit to the terminal in a 3rd layer or lower in an open system interconnection (OSI) 7 layer model.

The TOD synchronization adjusting and storage unit may be a gateway or a host personal computer (PC).

The time server and the TOD synchronization adjusting and storage unit may transmit and receive a TOD synchronization message by using a network time protocol (NTP) or a precision timing protocol (PTP).

In the converting of the delay compensated TOD information, the converting of the delay compensated TOD information according to a form of the registered and stored TOD information may be limited to a terminal that is registered and stored in the TOD synchronization adjusting and storage unit.

In the obtaining of the first path delay time, the first path delay time may be measured periodically or when required.

A network connecting the time server and the TOD synchronization adjusting and storage unit, and a network connecting the TOD synchronization adjusting and storage unit and the terminal may be a heterogeneous network.

In the multicasting and transmitting of the delay compensated TOD information, a period of multicasting the delay compensated TOD information may be identical to a period of obtaining the first path delay time.

The at least one of the plurality of terminals may be a wireless terminal.

According to another aspect of the present invention, there is provided an apparatus for synchronizing a TOD of a terminal in a convergent network, the apparatus including: a receiver that receives standard TOD information from a time server; and a TOD synchronization adjusting and storage unit that registers and stores identification information and TOD information of a terminal, and transmits delay compensated TOD information in a form of the TOD information of the terminal by applying a delay time caused by a TOD synchronization message transmission path between the time server and the terminal to the standard TOD.

When a plurality of terminals are connected to the TOD synchronization adjusting and storage unit, the TOD synchronization adjusting and storage unit may select one of the plurality of terminals, register and store identification information and TOD information of the plurality of terminals, store delay compensated TOD information in a form of the TOD information of the selected terminal by applying a delay time caused by a TOD synchronization message transmission path between the time server and the selected terminal on the standard TOD, and multicasting and transmitting the delay compensated TOD information to the plurality of terminals.

The delay time caused by the TOD synchronization message transmission path between the time server and the terminal may include a first path delay time caused by a TOD synchronization message transmission path between the TOD synchronization adjusting and storage unit and the terminal, and a second path delay time caused by a TOD synchronization message transmission path between the time server and the TOD synchronization adjusting and storage unit.

The TOD synchronization adjusting and storage unit may transmit the delay compensated TOD information from the TOD synchronization adjusting and storage unit to the terminal in a 3rd layer or lower in an open system interconnection (OSI) 7 layer model.

The TOD synchronization adjusting and storage unit may be a gateway or a host personal computer (PC).

The time server and the TOD synchronization adjusting and storage unit may transmit and receive a TOD synchronization message by using a network time protocol (NTP) or a precision timing protocol (PTP).

The delay time caused by the TOD synchronization message transmission path between the time server and the terminal may be measured periodically.

A network connecting the time server and the TOD synchronization adjusting and storage unit, and a network connecting the TOD synchronization adjusting and storage unit and the terminal may be a heterogeneous network.

A period of the TOD synchronization adjusting and storage unit multicasting the delay compensated TOD information may be identical to a period of measuring the delay time.

At least one of the plurality of terminals may be a wireless terminal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
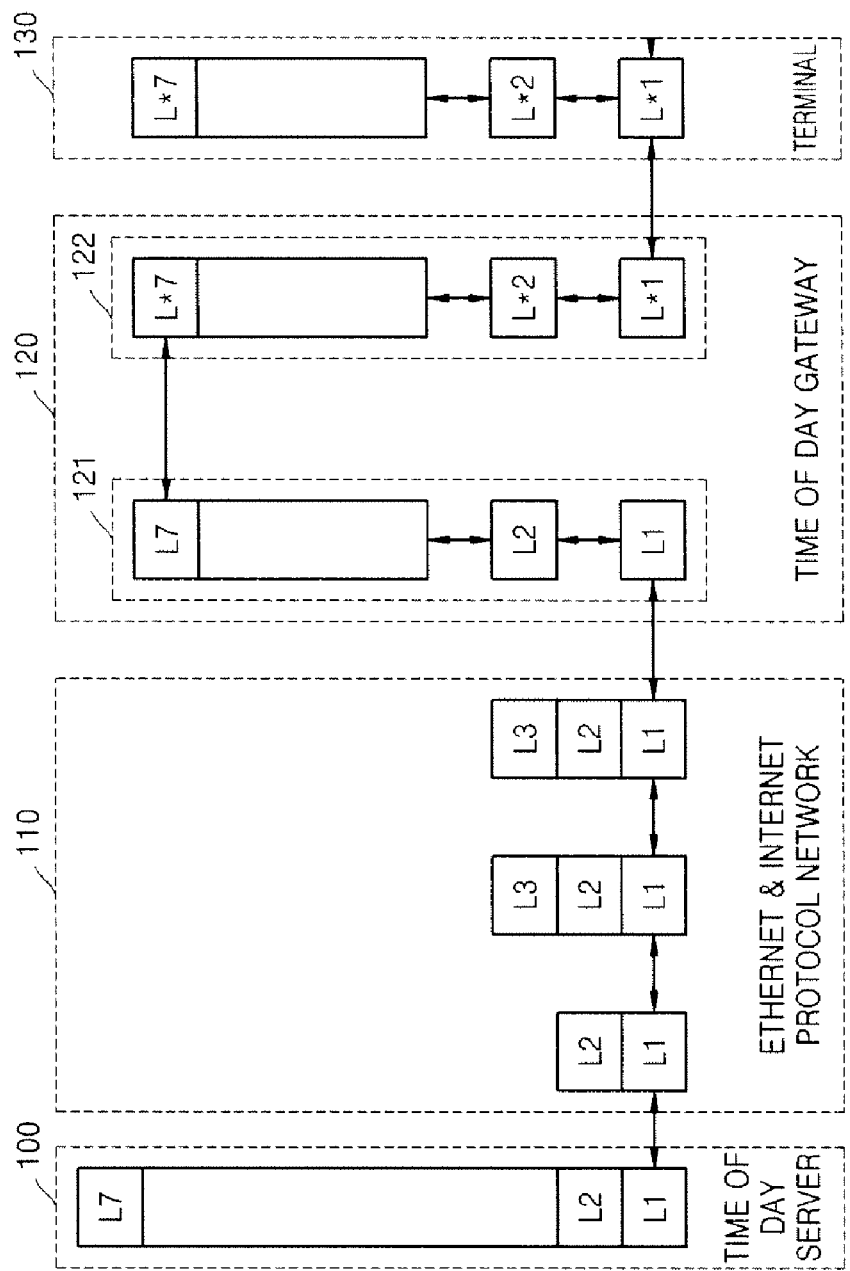
FIG. 1 is a diagram illustrating a structure for synchronizing a time of day (TOD) of a terminal and a TOD server connected in a conventional heterogeneous network.
Figure 2:
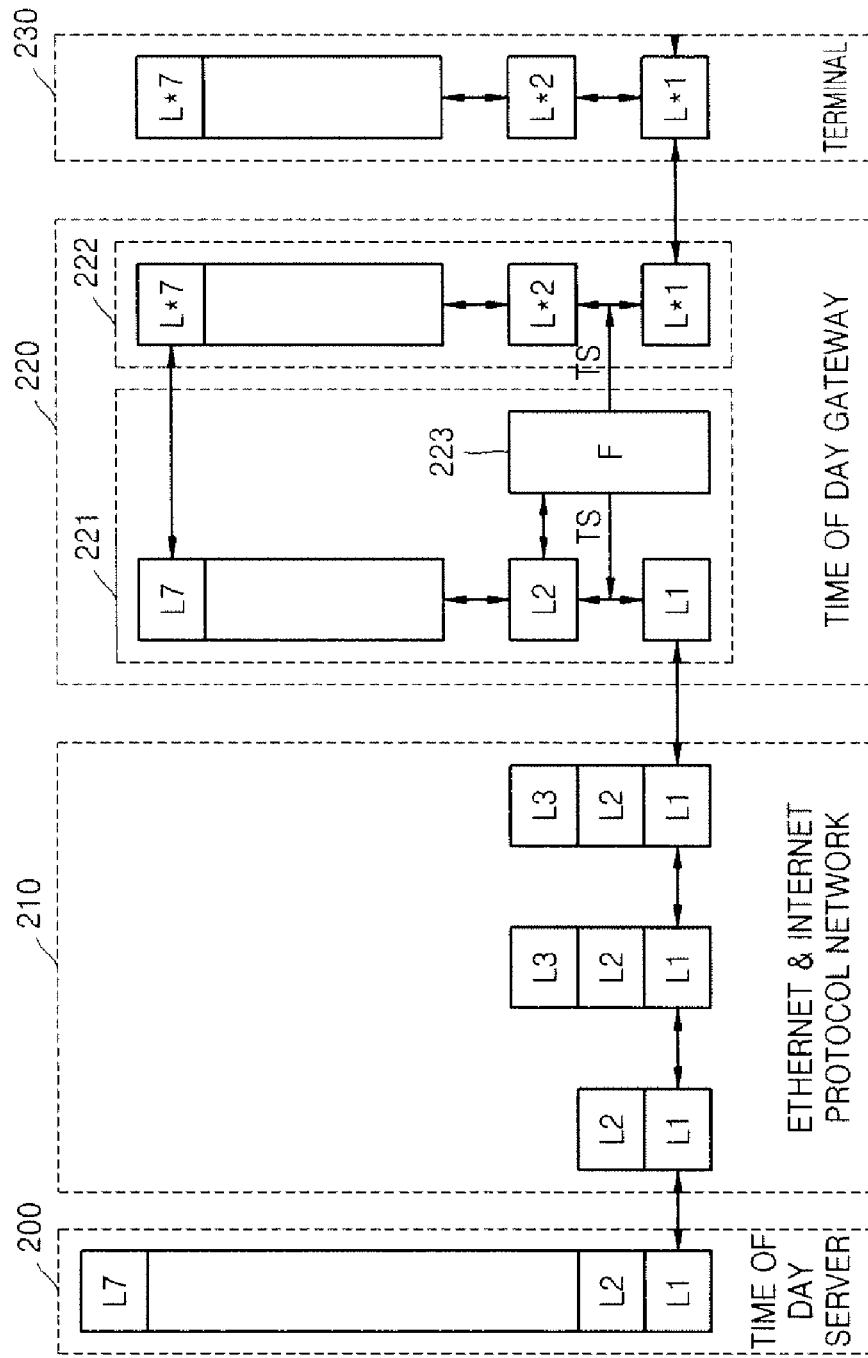
FIG. 2 is a diagram for describing a process of synchronizing a TOD using a TOD gateway according to an embodiment of the present invention.

FIG. 2 is a diagram for describing a process of synchronizing a time of day (TOD) by using a TOD gateway 220 according to an embodiment of the present invention.

TOD synchronization of a TOD server 200 and a terminal 230 is performed by the TOD server 200, the TOD gateway 220, and the terminal 230.

The TOD server 200 and the terminal 230 synchronizes TOD by using a network time protocol (NTP) or a precision timing protocol (PTP) in a network 210.

The TOD gateway 220 includes a filtering database 223, and thus stores identification information of the terminal 230 and TOD information that is to be provided to the terminal 230.

The TOD gateway 220 performs a TOD information processing operation that is usually performed in a conventional terminal.

In other words, the TOD gateway 220 pre-calculates a first error according to a transmission distance between the TOD server 200 and the TOD gateway 220, a second error according to a delay time for changing a data frame in the TOD gateway 220, and a third error according to a transmission distance between the TOD gateway 220 and the terminal 230, applies the first, second, and third errors to TOD information provided by the TOD server 200, and then transmits the TOD information to the terminal 230.

The TOD gateway 220 provides the TOD information applied with the first, second, and third errors according to the TOD information of the terminal 230 stored in the filtering database 223.

Accordingly, the terminal 230 directly recognizes the TOD information provided by the TOD gateway 220 without any operation.

The filtering database 223 of the TOD gateway 220 stores the identification information of the terminal 230 and the TOD information that is to be provided to the terminal 230, and thus enables the TOD synchronization of the TOD server 200 and the terminal 230 to be performed not in an upper layer but in an open systems interconnection (OSI) 3rd layer or lower.

Figure 3:
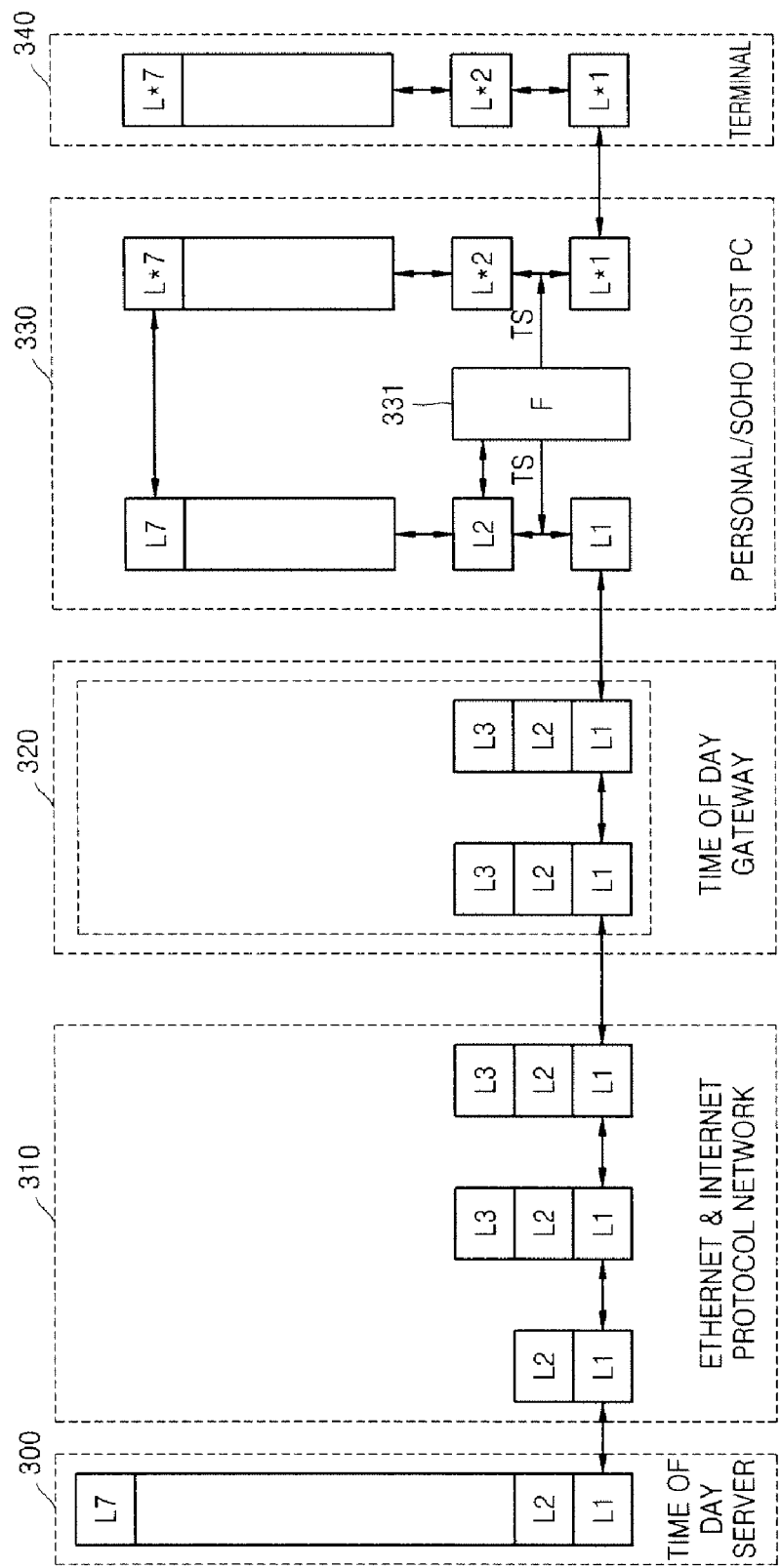
FIG. 3 is a diagram for describing a process of synchronizing a TOD by using a personal/soho host personal computer (PC) according to an embodiment of the present invention.

FIG. 3 is a diagram for describing a process of synchronizing a TOD using a personal/soho host personal computer (PC) 330 according to an embodiment of the present invention.

FIG. 3 illustrates an embodiment of realizing TOD synchronization of a time server 300 and a terminal 340 by using the personal/soho host PC 330.

The TOD synchronization of the TOD server 300 and the terminal 340 is performed by the TOD server 300, the personal/soho host PC 330, and the terminal 340.

The functions of the TOD gateway 223 of FIG. 2 are performed by the personal/soho host PC 330.

The personal/soho host PC 330 includes a filtering database 331, which stores identification information of the terminal 340 and TOD information that is to be provided to the terminal 340.

The filtering database 331 of the personal/soho host PC 330 stores the identification information and the TOD information, thereby enabling the TOD synchronization of the TOD server 300 and the terminal 340 to be performed not in an upper layer but in an OSI 3rd layer or lower.

Figure 4:
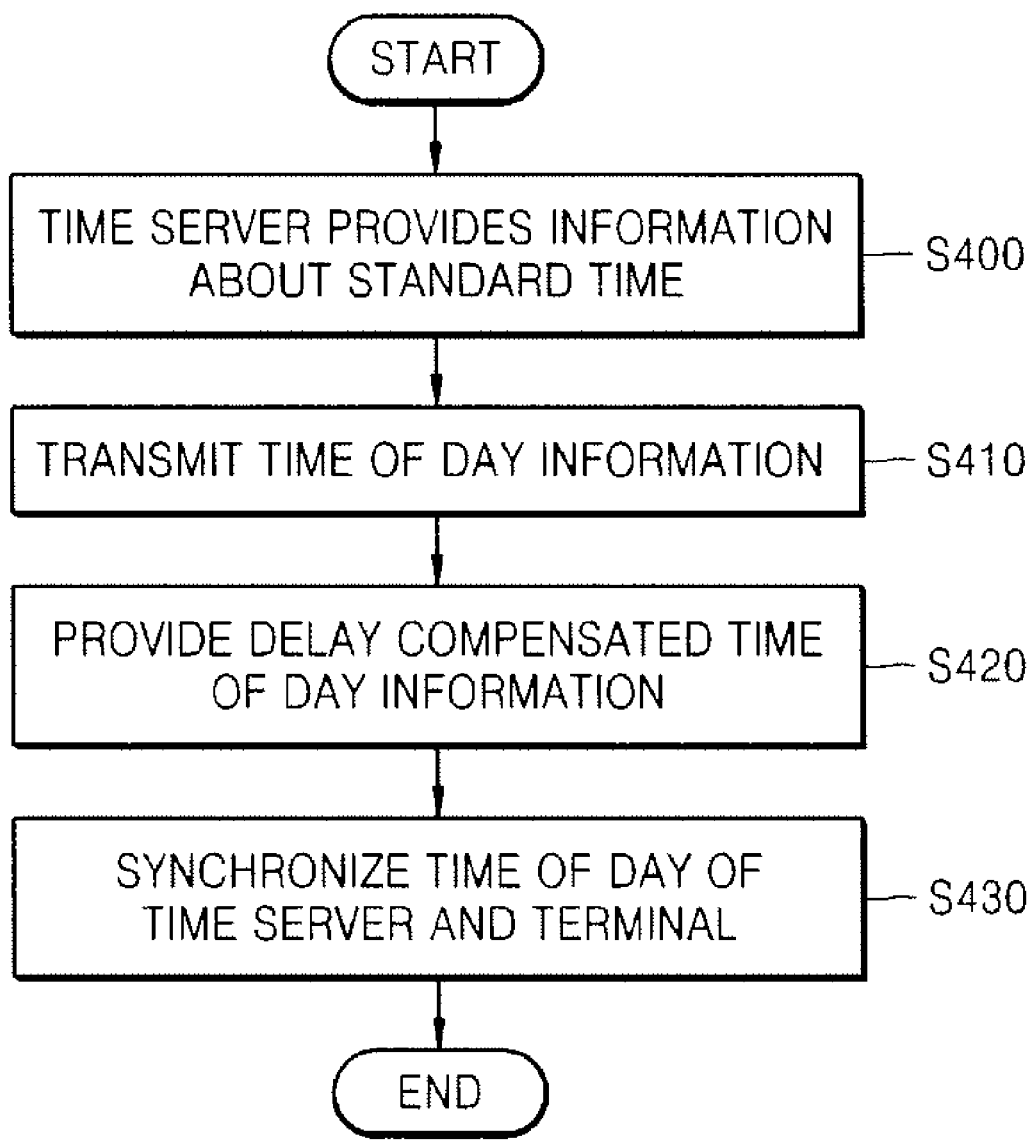
FIG. 4 is a flowchart illustrating processes of synchronizing a TOD according to an embodiment of the present invention.

FIG. 4 is a flowchart illustrating processes of synchronizing a TOD according to an embodiment of the present invention.

FIG. 4 illustrates processes of synchronization of a time server and a terminal and of transmitting TOD information from the time server to the terminal.

The timer server connected to an Ethernet or internet protocol (IP) network provides information about a standard time so as to synchronize the TOD with the terminal connected to a heterogeneous network in operation S400.

In operation S410, the time server transmits TOD information in a data frame or packet form according to a transmission method of the Ethernet or IP network.

An error or delay of the TOD information transmitted from the time server, the error or delay caused by a transmission distance, is compensated for in a TOD gateway or a host PC, and the delay compensated TOD information is provided to the terminal according to pre-registered identification information of the terminal and time information that is to be provided to the terminal, in operation 420.

Here, data frames or packets excluding the TOD information are transmitted to the terminal without compensating for transmission delay.

The terminal extracts the TOD information and synchronizes a local time with the standard time provided by the time server, thereby synchronizing the TOD of the time server and the integrated terminal in operation S430.

Figure 5A:
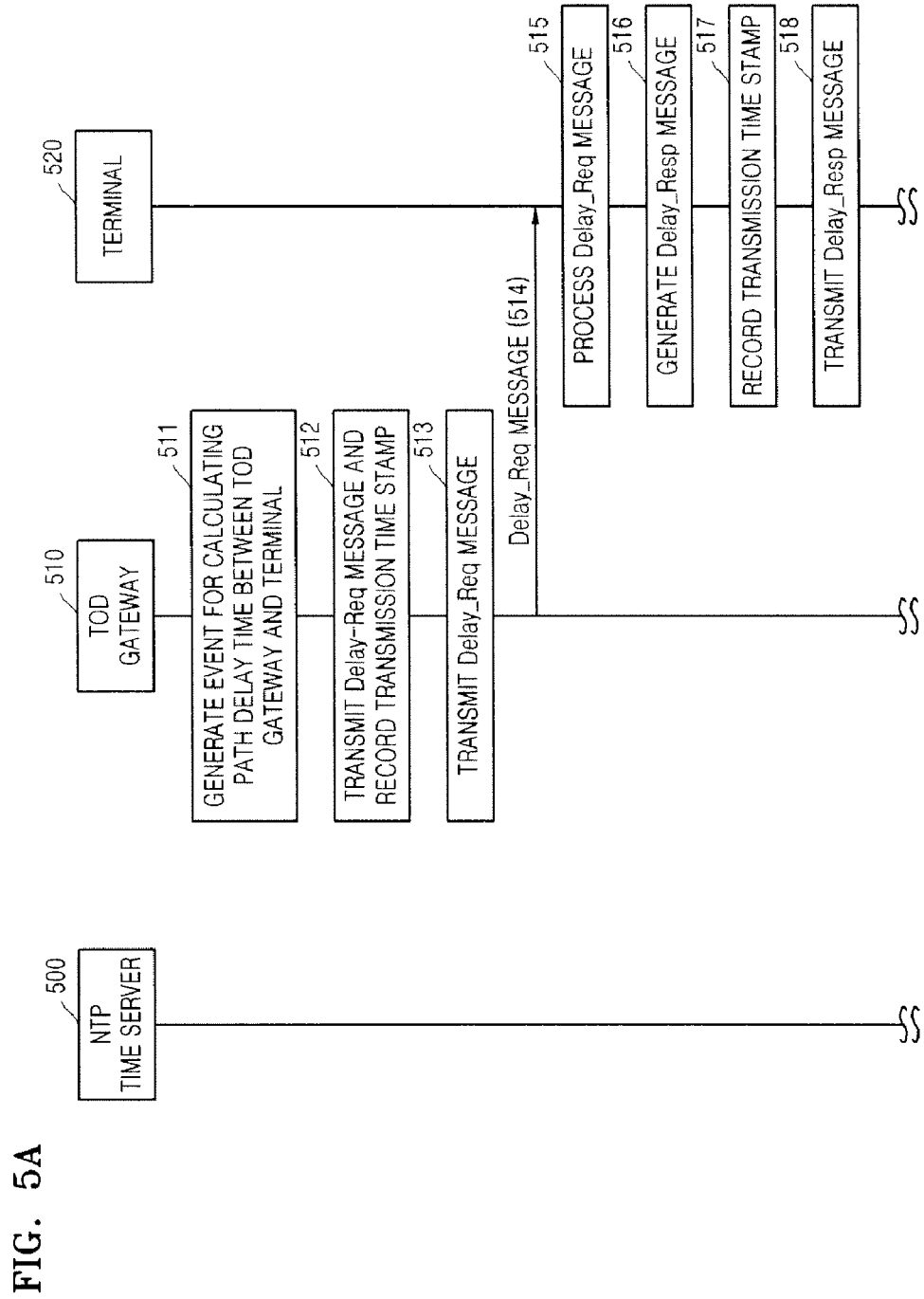
FIGS. 5A through 5C are diagrams for describing processes of synchronizing a TOD of a time server and a terminal by using a network time protocol (NTP), according to an embodiment of the present invention.
Figure 5B:
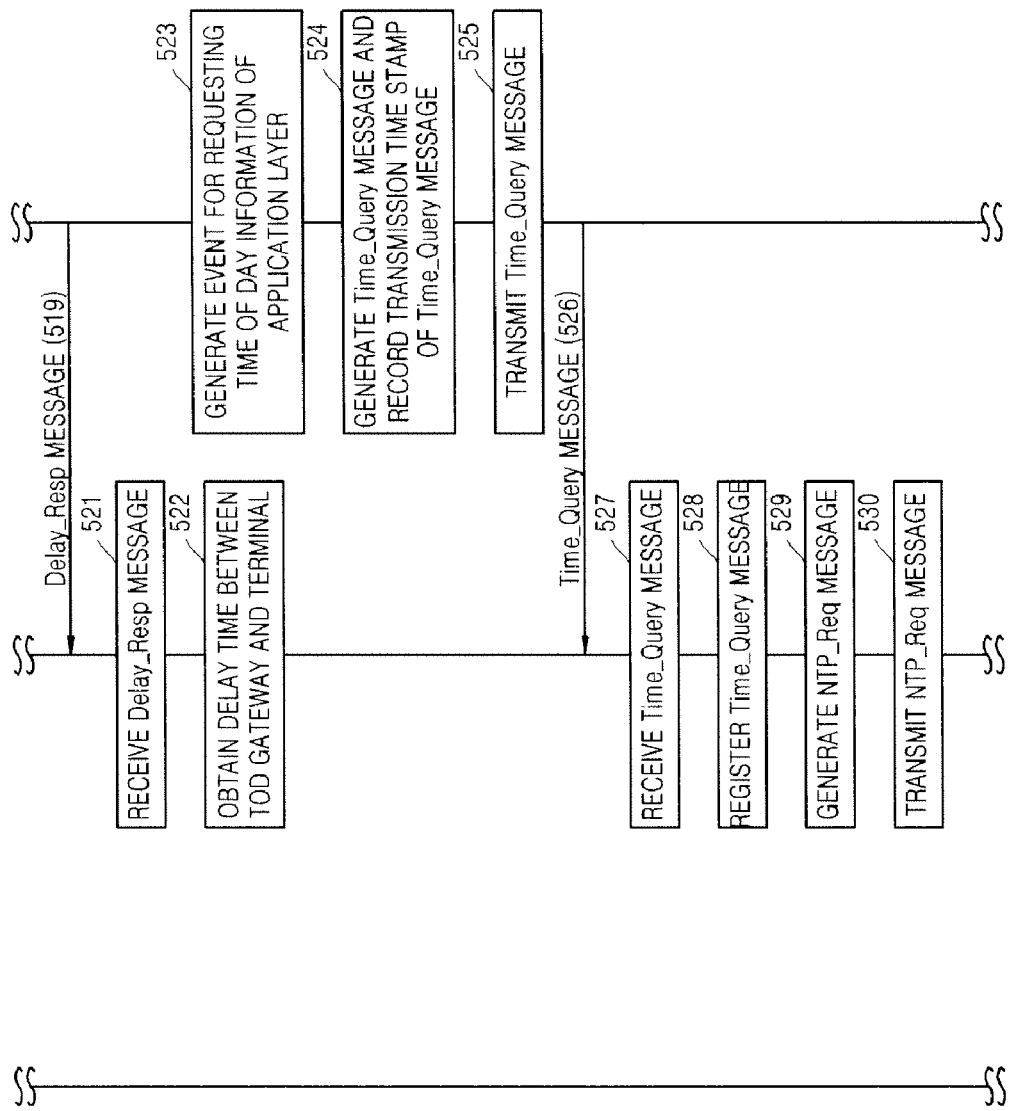
Figure 5C:
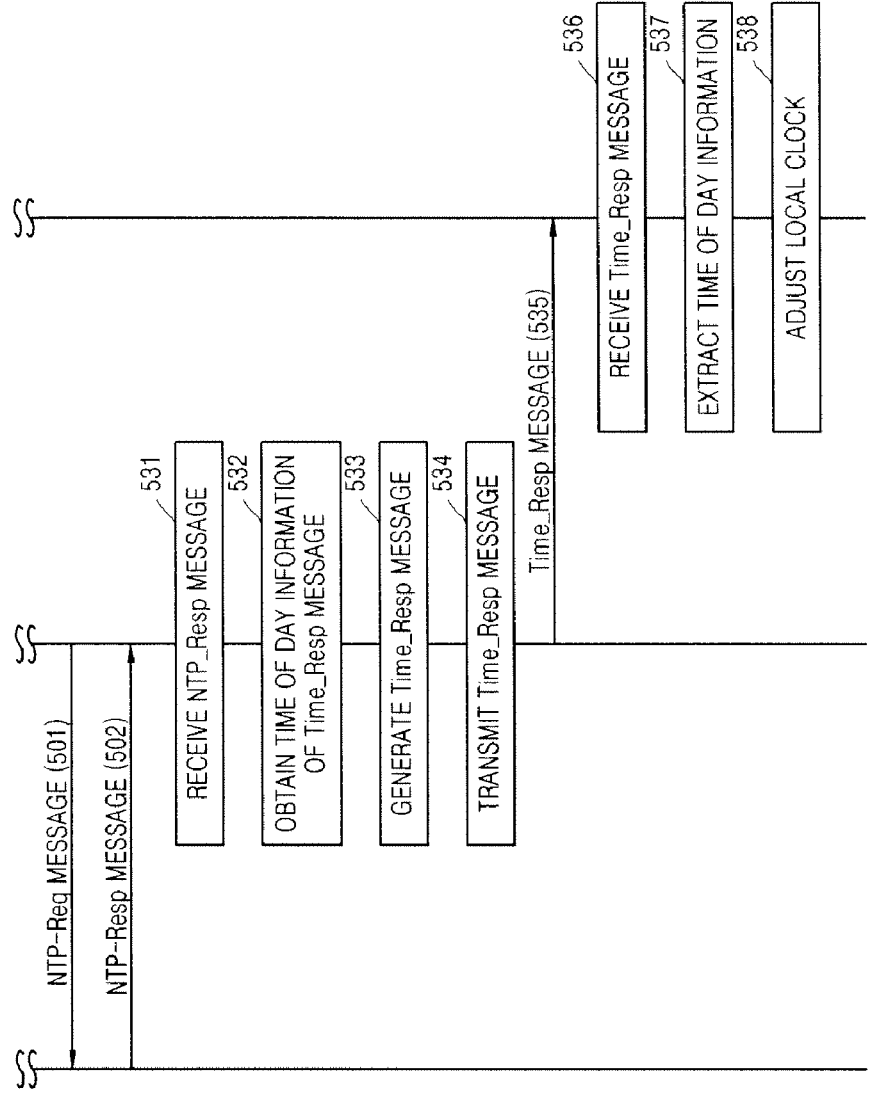
Figure 6A:
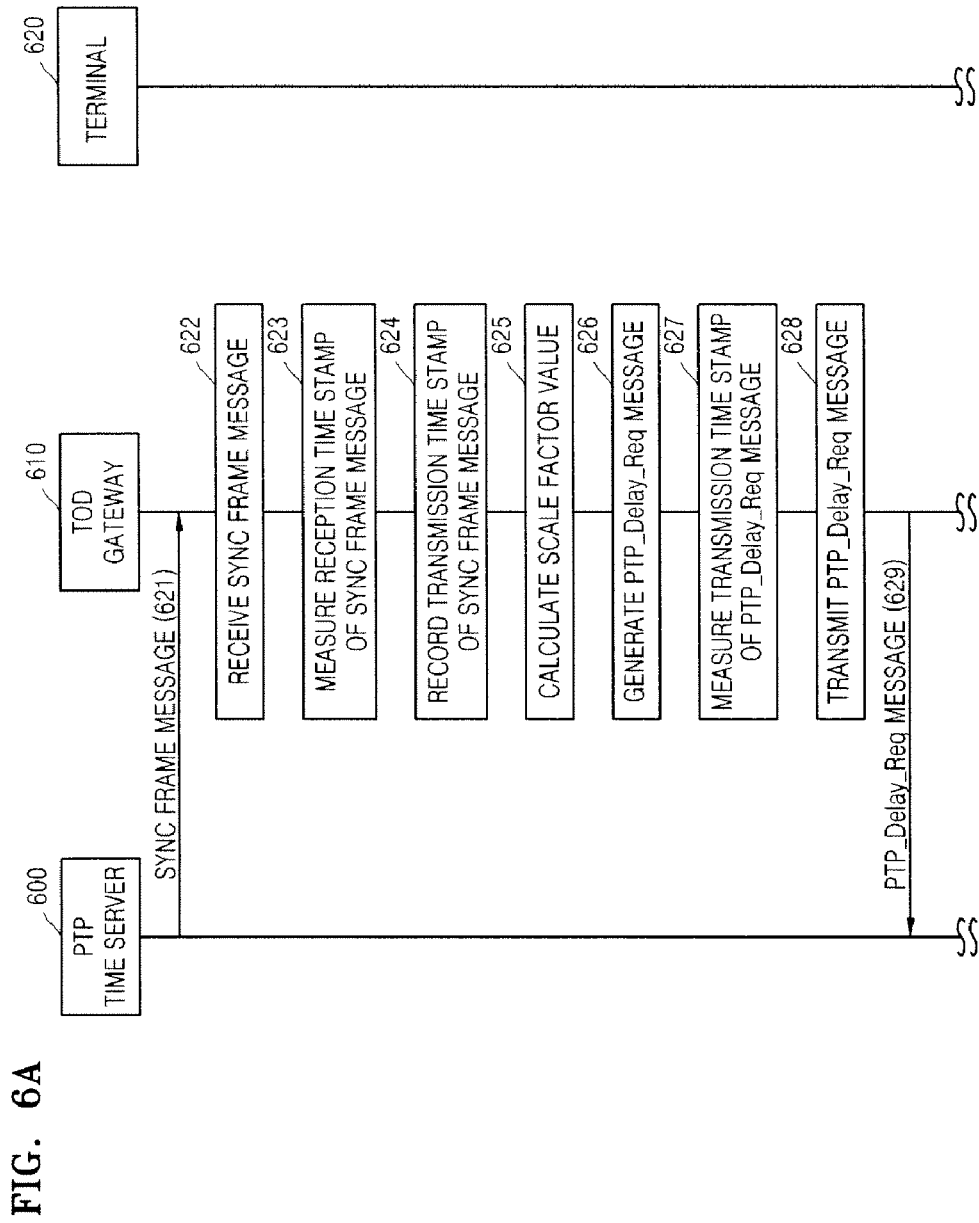
FIGS. 6A through 6D are diagrams for describing processes of synchronizing a TOD of a time server and a terminal by using a precision timing protocol (PTP), according to an embodiment of the present invention.
Figure 6B:
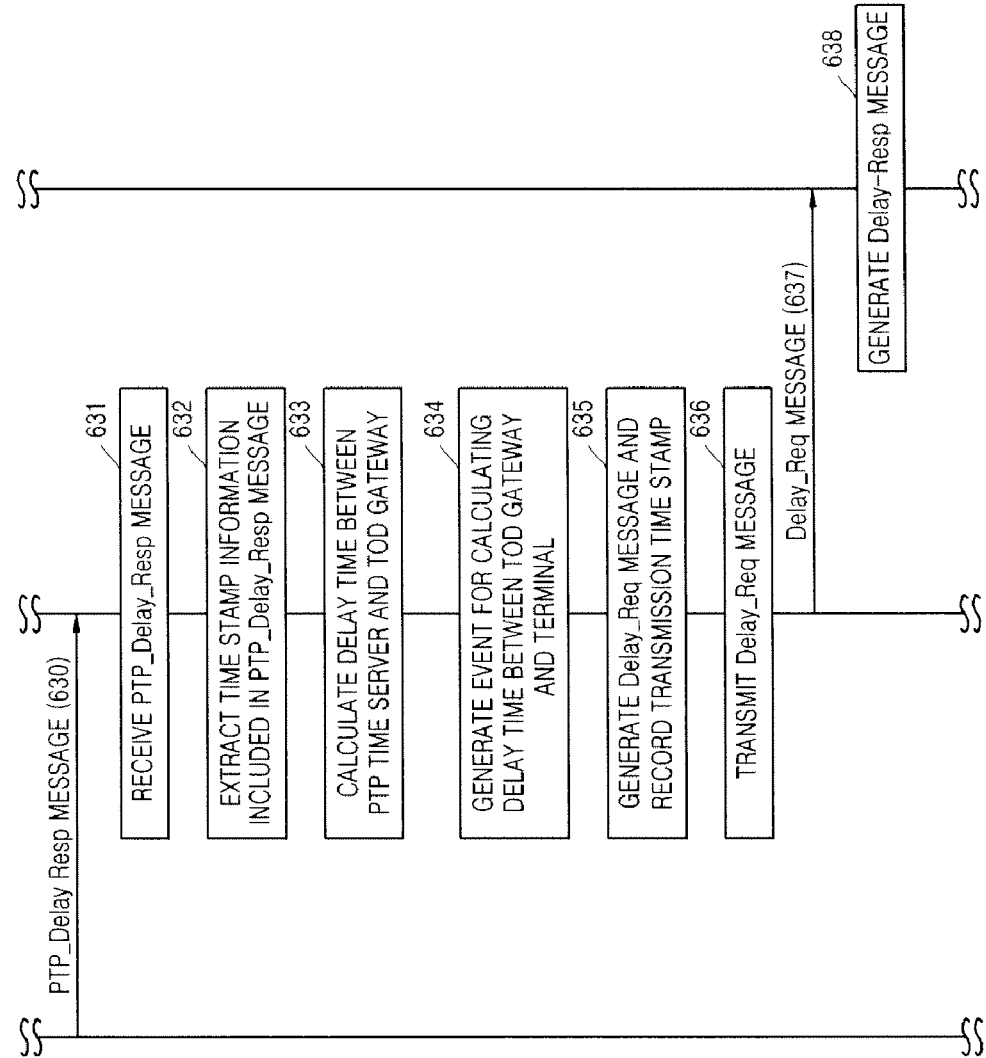
Figure 6C:
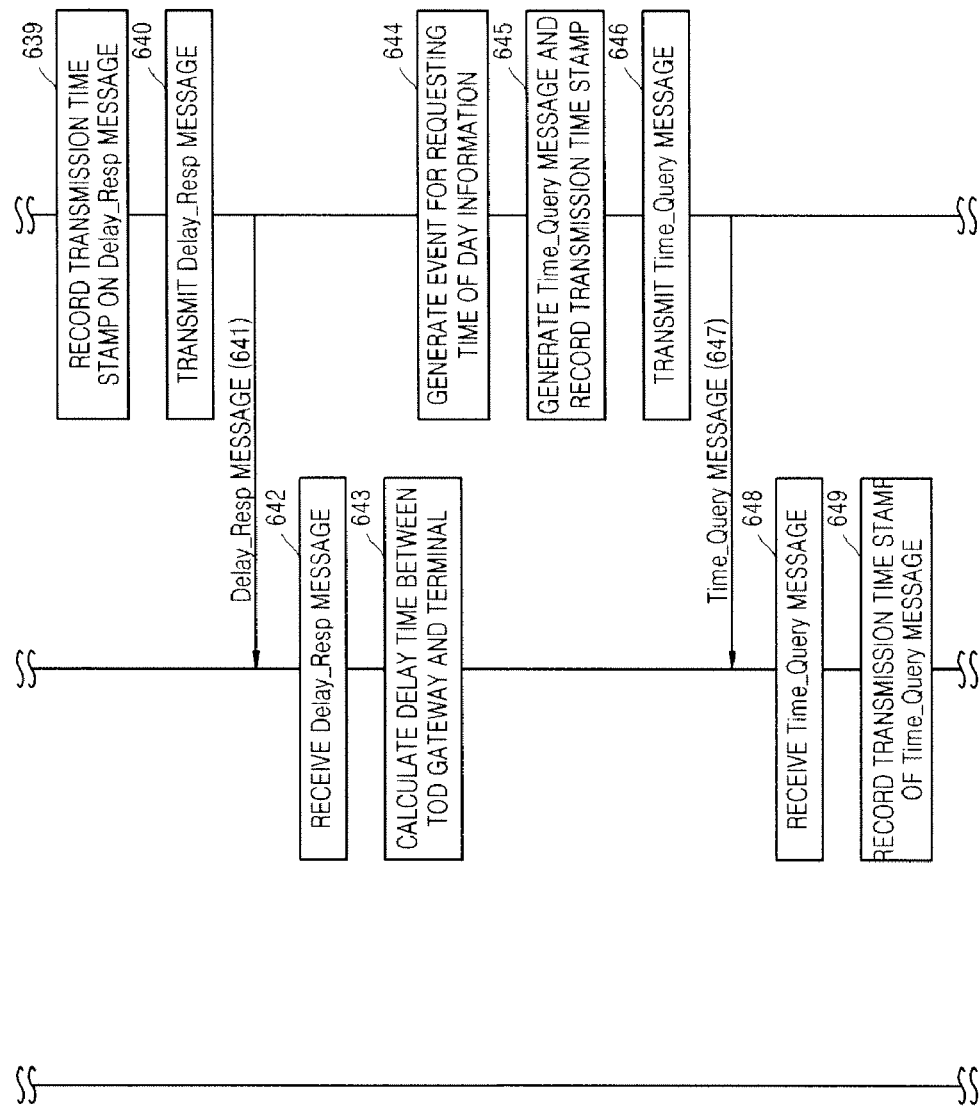
Figure 6D:
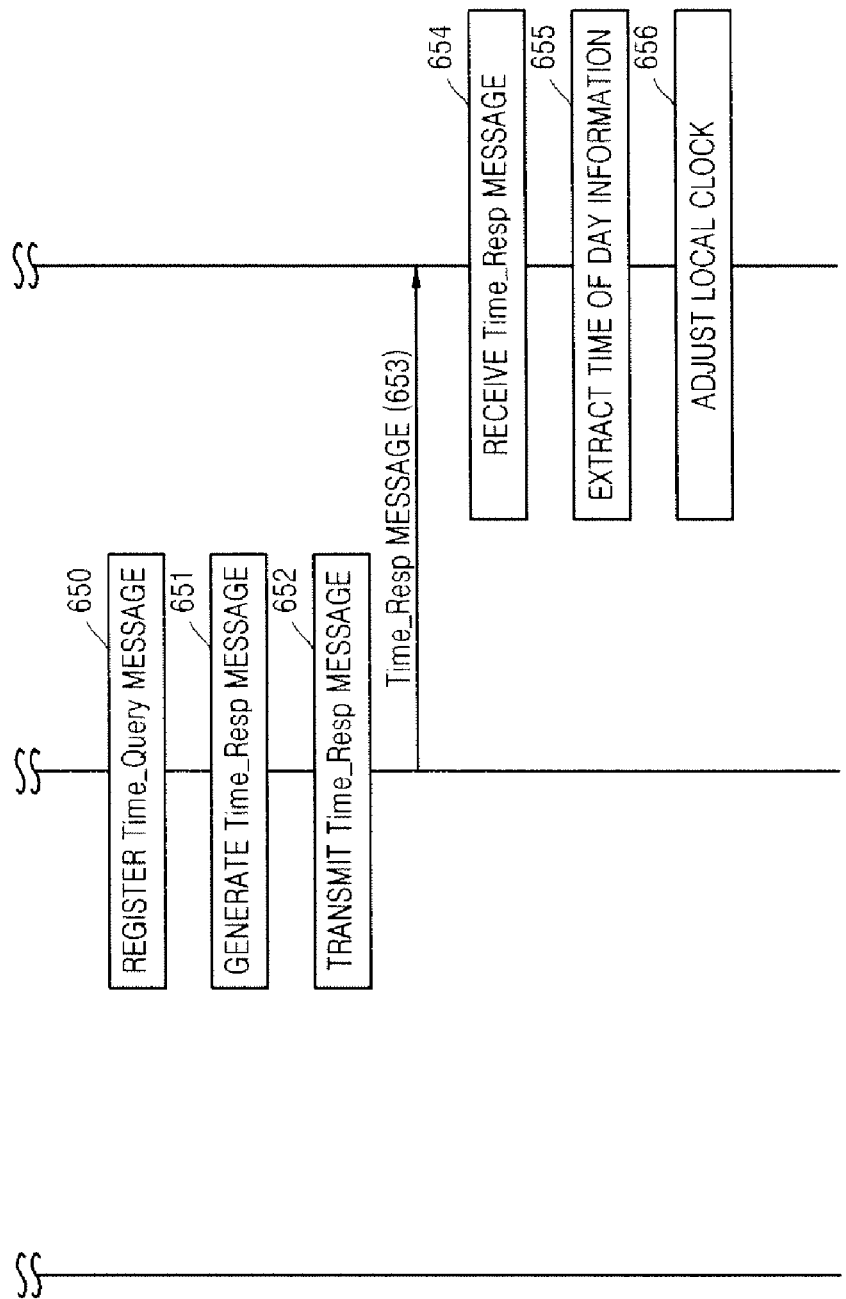

FIGS. 5A through 5C are diagrams for describing processes of synchronizing TOD of a NTP time server 500 and a terminal 520 by using a NTP, according to an embodiment of the present invention.

TOD synchronization of the NTP time server 500 and the terminal 520 is performed by the NTP time server 500, a TOD gateway 510, and the terminal 520.

Upon receiving a message (NTP_Req message) requesting transmission of TOD information from the TOD gateway 510 connected to a network in operation 501, the NTP time server 500 transmits a response message (NTP-Resp message) about the TOD information in operation 502.

The NPT time server 500 transmits the TOD information of the NTP time server 500 to the terminal 520 through the NTP-Resp message.

Operations 501 and 502 are performed according to the NTP standard, and a detailed description of the NTP standard is omitted in the current embodiment.

Operations of the TOD gateway 510 and the terminal 520 will now be described in detail.

When an event for calculating a path delay time between the TOD gateway 510 and the terminal 520 is generated in operation 511, the TOD gateway 510 prepares a Delay_Req message, which is a message for requesting calculation of the path delay time between the TOD gateway 510 and the terminal 520, records a transmission time stamp in operation 512, and transmits the Delay_Req message to the terminal 520 in operation 513.

Upon receiving the Delay_Req message, the terminal 520 processes the Delay-Req message in operation 515, generates a Delay-Resp message, which is a response message of the Delay_Req message, in operation 516, records the transmission time stamp in operation 517, and transmits the Delay_Resp message to the TOD gateway in operation 518.

The Delay_Resp message includes information about a reception time stamp of the Delay_Req message, and information about a transmission time stamp of the Delay_Resp message.

When the TOD gateway 510 receives the Delay_Resp message from the terminal 520 in operation 521, the TOD gateway 510 has 4 pieces of TOD information included in the Delay_Req message and the Delay_Resp message, i.e., a reception time stamp of the Delay_Resp message, a transmission time stamp of the Delay_Req message, a transmission time stamp of the Delay_Resp message, and a reception time stamp of the Delay_Req message.

By using the 4 pieces of TOD information, the TOD gateway 510 may obtain a delay time between two nodes, i.e. the TOD gateway 510 and the terminal 520 that exchanged messages, in operation 522.

The delay time may be obtained according to Equation 1 below.

$$\text{Delay Time} = [(\text{Reception Time Stamp of Delay\_Resp Message} - \text{Transmission Time Stamp of Delay\_Req Message}) - (\text{Transmission Time Stamp of Delay\_Resp Message} - \text{Reception Time Stamp of Delay\_Req Message})]/2 \quad \text{[Equation 1]}$$

In Equation 1, a time stamp is measured by hardware between input ports L1 and L2 and between output ports L1 and L2 of nodes of the TOD gateway 510.

Regarding the measuring of a delay time between two nodes, instead of measuring the delay time by using the TOD gateway 510 as represented by Equation 1, an event for measuring the delay time between two nodes may be generated by the terminal 520.

When the terminal 520 generates the event for measuring the delay time, the terminal 520 generates and transmits a Delay_Req message to the TOD gateway 510, and records a transmission time stamp of the Delay_Req message.

Upon receiving the Delay_Req message, the TOD gateway 510 transmits a message including a reception time stamp of the Delay_Req message and a transmission time stamp of a Delay_Resp message regarding a request for the delay time to the terminal 520, in response to the Delay_Req message.

Upon receiving the Delay_Resp message, the terminal 520 records the reception time stamp of the Delay_Resp message, and measures the delay time between two nodes as represented by Equation 1, by using the reception time stamp of the Delay_Resp message, the transmission time stamp of the Delay_Req message, the transmission time stamp of the Delay_Resp message, and the reception time stamp of the Delay_Req message.

An event for measuring the delay time between a network and a terminal connected to the network may be performed periodically or non-periodically based on a set state of a node.

Then, when an event for requesting TOD information of an application layer is generated in operation 523, the terminal 520 generates a Time_Query message, which is a message for requesting TOD information, and records a transmission time stamp in the Time_Query message, in operation 524, and transmits the Time_Query message to the TOD gateway in operation 525.

The Time_Query message is able to adjust a period of generating an event according to the performance and operating policy of the terminal 520.

Upon receiving the Time_Query message in operation 527, the TOD gateway 510 records a reception time stamp of the Time_Query message.

The identification information of the terminal 520 and a method of expressing the TOD recorded in the Time_Query message are recorded in the filtering database 223 of FIG. 2 in operation 528, and then the Time-Query message is terminated.

Then, the TOD gateway 510 generates the NTP_Req message according to an NTP standard in operation 529 and transmits the NTP_Req message to the NTP time server 500 in operation 530, so as to request TOD information of the NTP time server 500.

The NTP_Req message includes a transmission time stamp.

The NTP_Req message is transmitted to the NTP time server 500 via an L2/L3 communication network.

Upon receiving the NTP_Req message in operation 501, the NTP time server 500 prepares the NTP_Resp message and transmits the NTP_Resp message to a node that transmitted the NTP_Req message, in operation 502.

The NTP_Resp message includes TOD information of a transmission time stamp of the NTP_Req message, a reception time stamp of the NTP_Req message, and a transmission time stamp of the NTP_Resp message.

Upon receiving the NTP_Resp message, the TOD gateway 510 records a reception time stamp of the NTP_Resp message in operation 531.

An offset and delay time of the NTP time server 500 are obtained by applying Equation 2 below by using 4 pieces of time stamp information, i.e. the transmission time stamp of the NTP_Req message, the reception time stamp of the NTP_Req message, the transmission time stamp of the NTP_Resp message, and the reception time stamp of the NTP_Resp message.

(1) Delay Time=[(Reception Time Stamp of NTP_Resp Message−Transmission Time Stamp of NTP_Req Message)−(Transmission Time Stamp of NTP_Resp Message−Reception Time Stamp of NTP_Req Message)]/2

(2) Offset=(Reception Time Stamp of NTP_Req Message−Transmission Time Stamp of NTP_Req Message−Delay Time)  [Equation 2]

The form of the TOD information that is to be included in the Time_Query message may vary according to functions and performance of the terminal 520.

When the terminal 520 is able to use the NTP, the TOD gateway 510 generates a Time_Resp message by using a time stamp value of the NTP_Resp message, and when the terminal 520 is unable to use the NTP, TOD information is transmitted in a form registered in the filtering database 233 of FIG. 2.

When the terminal 520 is not able to use the NTP, the terminal 520 receives the TOD information in a form registered in the filtering database 223 of FIG. 2, and thus the TOD information is immediately recognized without separately operating the TOD information by using a processor.

The TOD gateway 510 generates the Time_Resp message in operation 533, applies the TOD information on the Time-Resp message, and then transmits the Time_Resp message to the terminal 520 in operation 534.

The TOD gateway 510 applies the delay time between the terminal 520 and the TOD gateway 510 to the TOD information of the NTP time server 500, the TOD information calculated via the NTP_Req message and the NTP_Resp message, and then transmits the TOD information. Accordingly, the terminal 520 can immediately use the TOD information of the NTP time server 500 without an additional operation.

By searching the filtering database 223 of FIG. 2, the TOD gateway 510 determines whether the generated Time_Resp message is a response to the Time_Query message that is already registered.

If the Time_Resp message is a response to the Time-Query message that is not registered in the filtering database 223 of FIG. 2, generation of the Time_Query message is stopped, and abolished.

Alternatively, if the Time-Resp message is a response to the Time_Query message that is already registered in the filtering database 223, the TOD gateway 510 generates a frame usable in a network to which the terminal 520 is connected by using registered information, and then transmits the frame to the terminal 520 after adding TOD information processed according to characteristics of the terminal 520 to the frame.

The Time_Query message received first from the terminal 520 is analyzed by the TOD gateway 510.

Regarding the analyzing of the Time_Query message, packet analysis (packet parsing) in hardware may be difficult to perform depending on the performance of a node of the TOD gateway 510. When the packet analysis in hardware is difficult to perform, a related function is performed in an application layer so as to extract related information and then record the related information in the filtering database 223 of FIG. 2.

However, since information about the terminal 520, which is already registered in the filtering database 223 of FIG. 2 can be used from the Time_Query message received second, generating and transmitting of a message by using hardware is simplified.

A load of an application layer is reduced by using hardware, and accordingly, accurate TOD information can be obtained and transmitted.

Upon receiving the Time-Resp message, the terminal 520 records a reception time stamp according to pre-assigned characteristics of the terminal 520 in operation 536.

In operation 537, the terminal 520 extracts the TOD information of the NTP time server 500 by performing a certain operation using the TOD information and the reception time stamp included in the Time_Resp message, or extracts the TOD information included in the Time-Resp message, and then adjusts a local clock of the terminal 520 in operation 538.

The terminal 520 may be connected to a general wired network, Zigbee (802.15.4), Bluetooth, wireless LAN (802.16.a, b, g, n), or the like. Specifically, performance of the present invention is better in Zigbee and Bluetooth networks, which use a low speed transmission method.

The functions of the TOD gateway 510 described in the embodiment in which the terminal 520 is synchronized to NTP TOD information, may be performed by a host PC for home or a small office and home office (SOHO) environment.

The host PC 330 of FIG. 3 installing an interface connectable to a terminal performs the same functions as the TOD gateway 220 of FIG. 2.

The host PC 330 installing the interface connectable to a terminal measures a delay time between the terminal 340 of FIG. 3 and the host PC 330 periodically or non-periodically by applying Equation 3.

Alternatively, the terminal 340 may measure the delay time between the terminal 340 and the host PC 330 periodically or non-periodically by applying Equation 3.

Delay Time=[(Reception Time Stamp of Delay_Resp Message−Transmission Time Stamp of Delay_Req Message)−(Transmission Time Stamp of Delay_Resp Message−Reception Time Stamp of Delay_Req Message)]/2  [Equation 3]

The terminal 340 transmits the Time_Query message only when required. Upon receiving the Time-Query message, the host PC 330 records identification information of the terminal 340, TOD information to be provided, and the reception time stamp of the Time_Query message in the filtering database 331 of FIG. 3, and then transmits the NTP_Req message to the NTP time server 300.

The NTP time server 300 transmits the NTP_Resp message to the host PC 330, and the host PC 330 records the reception time stamp of the received NTP_Resp message.

An offset and delay time of the NTP time server 300 are obtained by applying Equation 4, by using the transmission time stamp of the NTP_Req message, the reception time stamp of the NTP_Requ message, the transmission time stamp of the NTP_Resp message, and the reception time stamp of the NTP_Resp message.

(1) Delay Time=[(Reception Time Stamp of NTP_Resp Message−Transmission Time Stamp of NTP_Req Message)−(Transmission Time Stamp of NTP_Resp Message−Transmission Time Stamp of NTP_Req Message)]/2

(2) Offset=(Reception Time Stamp of NTP_Req Message−transmission Time Stamp of NTP_Req Message−Delay Time)  [Equation 4]

The host PC 330 generates the Time_Resp message, and transmits TOD information that is processed into a form requested by the terminal 340 that requested the TOD information.

Upon receiving the Time_Resp message, the terminal 450 records a reception time stamp according to pre-assigned characteristics of the terminal 340, and extracts the TOD information of the NTP time server 300 by performing a certain operation using the TOD information and the reception time stamp included in the Time_Resp message, or extracts the TOD information included in the Time-Resp message, and then adjusts a local clock of the terminal 340 in operation 538.

In the current embodiment, a time stamp in hardware regarding a synchronization frame is supported between a layer L1 and a layer L2 of an input port and an output port, and thus, more precise TOD information is provided compared to a time stamp in software.

When the filtering database 331 is realized in hardware, information about the terminal 340, which is already registered in the filtering database 331 can be used from the Time_Query message received second, and thus generating and transmitting of a message by using hardware is simplified.

A load of an application layer is reduced by using hardware, and accordingly, accurate TOD information can be obtained and transmitted.

FIGS. 6A through 6D are diagrams for describing processes of synchronizing a TOD of a PTP time server 600 and a terminal 620 by using a PTP, according to an embodiment of the present invention.

TOD synchronization of the PTP time server 600 and the terminal 620 is performed by the PTP time server 600, a TOD gateway 610, and the terminal 620.

The PTP time server 600 performs functions of a master, and the TOD gateway 610 performs functions of a bridge or a slave.

The terminal 620 performs functions of a slave according to circumstances.

The PTP time server 600 operating as a master transmits a Sync frame message, which is a synchronization frame, to the TOD gateway 610 in a predetermined interval, in operation 621.

Upon receiving the Sync frame message in operation 622, the TOD gateway 610 measures a reception time stamp at a point between a layer L1 and a layer L2 of an input port in operation 623.

When the TOD gateway 610 is not a terminal, the TOD gateway 610 transmits the Sync frame message to a neighboring node, and records a transmission time stamp of the Sync frame message in operation 624.

The TOD gateway 610 calculates a scale factor value in operation 625 via a time interval of the transmission time stamp and a reception time stamp of the Sync frame message included in two Sync frame messages input in a predetermined interval.

The TOD gateway 610 predicts a master TOD by compensating for an error of local TOD by using the scale factor value.

The calculating of the scale factor value is continuously repeated while the Sync frame message is input.

When the TOD gateway 610 is in a slave state, the TOD gateway 610 generates a PTP_Delay_Req message in operation 626 in a predetermined interval, wherein the PTP_Delay_Req message is a message for measuring a delay time between the PTP time server 600, which is a master, and the TOD gateway 610.

The TOD gateway 610 measures a transmission time stamp of the generated PTP_Delay_Req message in operation 627, and transmits the PTP_Delay_Req message to the PTP time server 600 in operation 628.

In response to the PTP_Delay_Req message, the PTP time server 600, which is a master, generates a PTP_Delay_Resp message, and transmits the PTP_Delay_Resp message to the TOD gateway 610, which is a slave, in operation 630.

In the current embodiment, the receiving of the PTP_Delay_Req message and the transmitting of the PTP_Delay_Resp message are performed according to the PTP standard, and detailed descriptions of the PTP standard will be omitted herein.

Operations of the TOD gateway 610 and the terminal 620 during TOD synchronization of the PTP time server 600 and the terminal 620 via PTP will now be described in detail.

Upon receiving the PTP_Delay_Resp message in operation 631, the TOD gateway 610 extracts time stamp information included in the PTP_Delay_Resp message in operation 632.

In operation 633, a delay time and an offset between the PTP time server 600 and the TOD gateway 610 are calculated as shown in Equation 5.

(1) Delay Time=[(Reception Time Stamp of PTP_Delay_Resp Message−Transmission Time Stamp of PTP_Delay_Req Message)−(Reception Time Stamp of PTP_Delay_Resp Message−Reception Time Stamp of PTP_Delay_Req Message)]/2

(2) Offset=(Reception Time Stamp of PTP_De-
lay_Req Message−Transmission Time Stamp of
PTP_Delay_Req Message−Delay Time)    [Equation 5]

When an event for calculating the delay time between the TOD gateway 610 and the terminal 620 is generated in operation 634, the TOD gateway 610 generates a Delay_Req message, which is a message for requesting to calculate the delay time between the TOD gateway 610 and the terminal 620, and records a transmission time stamp in operation 635, and the transmits the Delay_Req message to the terminal 620 in operation 636.

The generating of the Delay_Req message, the recording of the transmission time stamp, and the transmitting of the Delay_Req message performed by the TOD gateway 610 are the same processes as the embodiment about the synchronization of the TOD of a time server and a terminal using NTP in FIG. 5.

Upon receiving the Delay_Req message, the terminal 620 generates a Delay_Resp message, which is a response message to the Delay_Req message, in operation 638.

The terminal 620 records a transmission time stamp on the generated Delay_Resp message in operation 639, and then transmits the Delay-Resp message to the TOD gateway 610 in operation 640.

The reception time stamp of the Delay_Req message and the transmission time stamp of the Delay_Resp message are included in the Delay_Resp message.

When the TOD gateway 610 receives the Delay_Resp message from the terminal 620 in operation 642, the TOD gateway 610 contains 4 pieces of TOD information, i.e. the reception time stamp of the Delay_Resp message, the transmission time stamp of the Delay_Req message, the transmission time stamp of the Delay_Resp message, and the reception time stamp of the Delay_Req message, which are included in the Delay_Req message and the Delay-Resp message.

The TOD gateway 610 calculates the delay time between two nodes, which are the TOD gateway 610 and the terminal 620 that exchanged messages, by using the 4 pieces of TOD information, in operation 643.

The delay time may be obtained via Equation 6 below.

Delay Time=[(Reception Time Stamp of Delay_Resp
Message−Transmission Time Stamp of
Delay_Req Message)−(Transmission Time
Stamp of Delay_Resp Message−Reception Time
Stamp of Delay_Req Message)]/2    [Equation 6]

The time stamps in Equation 6 are measured by hardware between a layer L1 and a layer L2 of an input port and a layer L1 and a layer L2 of an output port of the TOD gateway 610.

While measuring a delay time between two nodes, the terminal 620 may generate an event for measuring the delay time between the two nodes, instead of the TOD gateway 610 measuring the delay time as given by Equation 6.

When the terminal 620 generates the event for measuring the delay time, the terminal 620 generates the Delay_Req message, transmits the Delay_Req message to the TOD gateway 610, and records the transmission time stamp.

Upon receiving the Delay_Req message, the TOD gateway 610 transmits a message including the reception time stamp of the Delay_Req message and the transmission time stamp of the Delay_Resp message to the terminal 620 in response to the Delay_Req message.

Upon receiving the Delay_Resp message, the terminal 620 records the reception time stamp of the Delay_Resp message, and obtains the delay time between two nodes via Equation 6, by using the 4 pieces of TOD information, i.e. the reception time stamp of the Delay_Resp message, the transmission time stamp of the Delay_Req message, the transmission time stamp of the Delay_Resp message, and the reception time stamp of the Delay_Req message.

An event for measuring the delay time between a network and a terminal connected to the network may be periodical or non-periodical according to a set state of a node.

Then, when an event for requesting TOD information of an application layer is generated in operation 644, the terminal 620 generates a Time_Query message, which is a message for requesting TOD information, and records a transmission time stamp of the Time_Query message in operation 645, and then transmits the Time_Query message to the TOD gateway 610 in operation 646.

The Time_Query message is able to adjust a period of generating an event according to performance and policy of the terminal 620.

Upon receiving the Time_Query message in operation 648, the TOD gateway 610 records a reception time stamp of the Time_Query message in operation 649.

Identification information and a method of expressing TOD recorded in the Time_Query message are registered in the filtering database 223 of FIG. 2 in operation 650, and then the Time-Query message is terminated.

Then, the TOD gateway 610 prepares TOD information to be included in the Time_Query message in a form according to functions and performance of the terminal 620, by using the scale factor value, the offset, and the delay time that are calculated previously.

If the terminal 620 can use the PTP, the TOD gateway 610 generates the Time_Resp message by using the PTP_Resp message, and if the terminal 620 cannot use the PTP, the TOD information is transmitted in a form registered in the filtering database 223 of FIG. 2.

Since the terminal 620 receives the TOD information in the form registered in the filtering database 223 when the terminal 620 cannot use the PTP, the TOD information can be immediately used without a separate operation having to be performed by a processor.

The TOD gateway 610 generates a Time_Resp message in operation 651, applies the TOD information, and then transmits the Time_Resp message to the terminal 620 in operation 652.

The TOD gateway 610 transmits the TOD information of the PTP time server 600, which is obtained via the Time_Query message and the Time_Resp message, to the terminal 620, by applying the delay time between the terminal 620 and the TOD gateway 610 on the TOD information of the PTP time server 600. Accordingly, the terminal 620 is able to immediately use the TOD information of the PTP time server 600.

The TOD gateway 610 determines whether the Time_Resp message is a response message to the Time_Query message that is already registered in the filtering database 223.

If the Time_Resp message is a response message to the Time_Query message that is not registered in the filtering database 223, the generation of the Time_Resp message is stopped, and abolished.

Alternatively, if the Time_resp message is a response message to the Time_Query message that is already registered in the filtering database 223, the TOD gateway 610 generates a frame usable in a network to which the terminal 620 is connected, by using registered information, and then the terminal 620 receives TOD information that is processed according to characteristics of the terminal 620.

The time Query that is received first from the terminal 620 is analyzed by the TOD gateway 610.

Regarding the analyzing of the Time_Query message, packet analysis (packet parsing) in hardware may be difficult to perform depending on the performance of a node of the TOD gateway 610. When the packet analysis in hardware is difficult to perform, a related function is performed in an application layer so as to extract related information and then record the related information in the filtering database 223 of FIG. 2.

However, since information about the terminal 620 that is already registered in the filtering database 223 of FIG. 2 can be used from the Time_Query message received second, generating and transmitting of a message by using hardware is simplified.

A load of an application layer is reduced by using hardware, and accordingly, accurate TOD information can be obtained and transmitted.

Upon receiving the Time_Resp message in operation 654, the terminal 620 records a reception time stamp according to pre-assigned characteristics of the terminal 620.

In operation 656, the terminal 620 extracts the TOD information of the PTP time server 600 via a certain operation by using the TOD information and the reception time stamp included in the Time_Resp message, or extracts the TOD information included in the Time-Resp message, and then adjusts a local clock of the terminal 620 in operation 656.

The terminal 620 may be connected to a general wired network, Zigbee (802.15.4), Bluetooth, wireless LAN (802.16.a, b, g, n), or the like.

Figure 7:
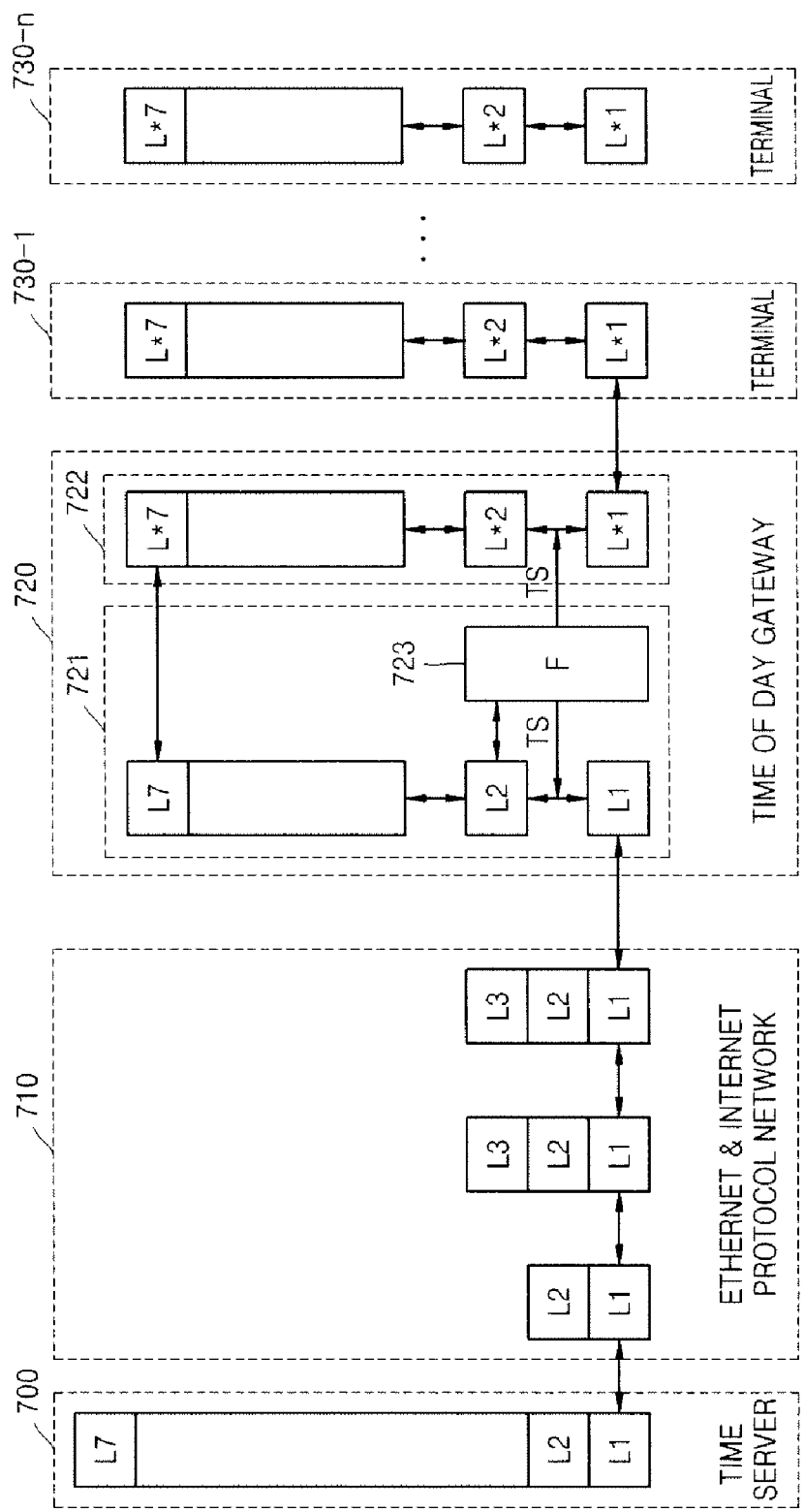
FIG. 7 is a diagram illustrating a structure for synchronizing a TOD of a time server and a plurality of terminals, according to an embodiment of the present invention.

FIG. 7 is a diagram illustrating a structure for synchronizing a TOD of a time server 700 and a plurality of terminals 730-1 through 730-n, according to an embodiment of the present invention.

TOD synchronization of the time server 700 and the plurality of terminals 730-1 through 730-n is performed by the time server 700, a TOD gateway 720, and the plurality of terminals 730-1 through 730-n.

Functions of the TOD gateway 720 may be performed by a host PC.

In FIG. 7, the time server 700 and the plurality of terminals 730-1 through 730-n synchronize TOD by using the NTP or the PTP.

Figure 8:
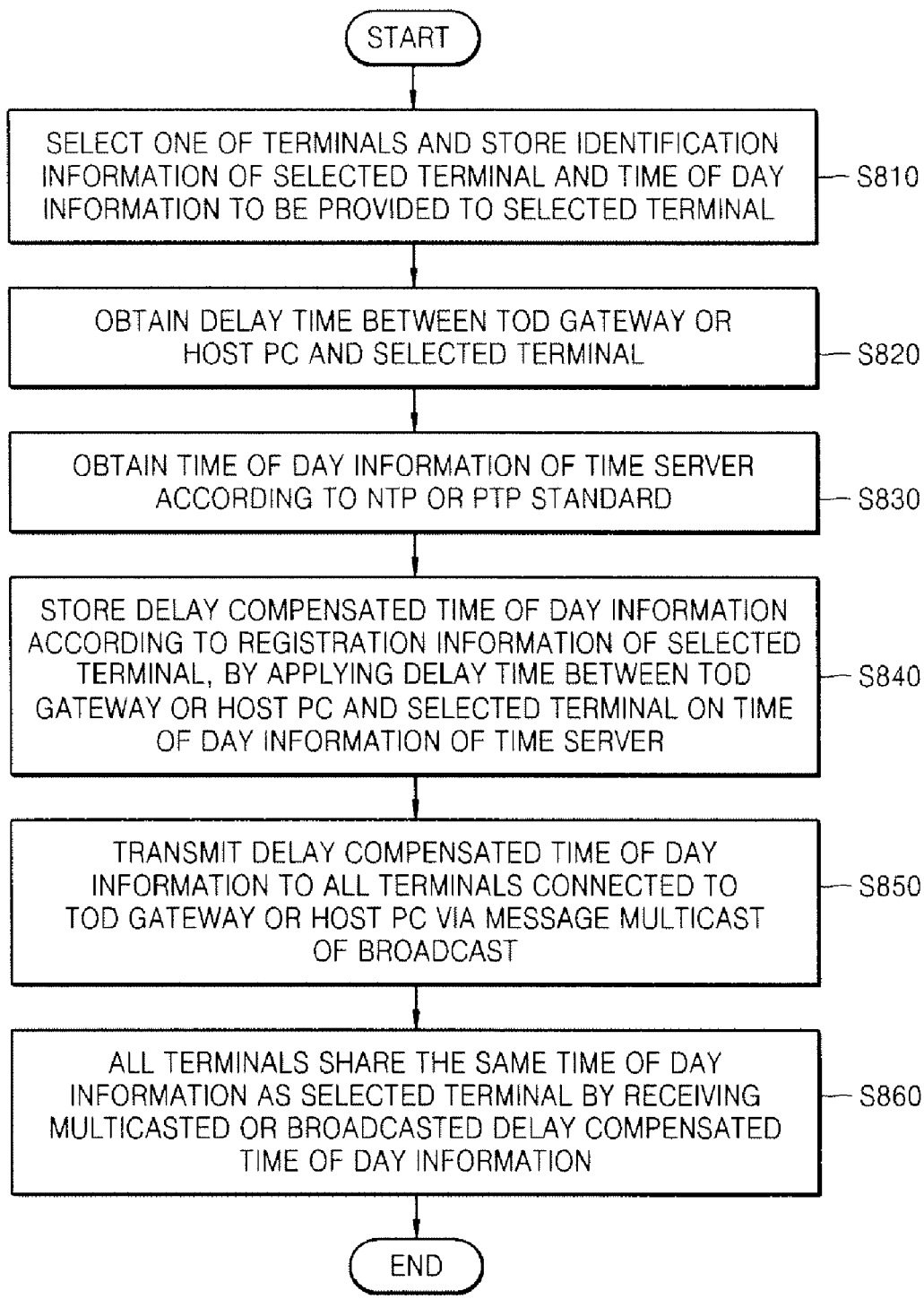
FIG. 8 is a flowchart illustrating processes of synchronizing a TOD of a time server and a plurality of terminals, according to an embodiment of the present invention.

FIG. 8 is a flowchart illustrating processes of synchronizing a TOD of a time server and a plurality of terminals, according to an embodiment of the present invention.

A TOD gateway or a host PC selects one terminal from among the plurality of terminals currently connected to the TOD gateway or the host PC, and stores identification information of the selected terminal and TOD information to be provided to the selected terminal, in operation S810.

The TOD gateway or the host PC obtains a delay time between the selected terminal and the TOD gateway or the host PC by using one of Equations 1, 3, and 6, in operation S820.

The TOD gateway or the host PC obtains TOD information of a time server according to the NTP or PTP standard, by using one of Equations 2, 4, and 5, in operation S830.

The TOD gateway or the host PC stores delay compensated TOD information according to registration information of the selected terminal in operation S840, by applying the delay time between the TOD gateway or the host PC and the selected terminal, wherein the delay time is obtained by exchanging messages between the TOD gateway or the host PC and the selected terminal, to the TOD information of the time server, in operation S840.

The delay compensated TOD information stored in the TOD gateway or the host PC is transmitted to all terminals connected to the TOD gateway or the host PC via a message multicast or broadcast, in operation S850.

By receiving the multicasted or broadcasted delay compensated TOD information, all terminals share the same TOD information as the selected terminal in operation S860.

A period of multicasting or broadcasting the delay compensated TOD information may be based on generation of Time_Query and Time_Resp messages of a terminal.

Also, the period of multicasting or broadcasting the delay compensated TOD information may be forcibly set by the TOD gateway or the host PC.

One of the terminals is selected via identification information of a terminal, delay time with the TOD gateway or the host PC, and strength of a signal in a wireless connection domain.

According to a method of transmitting the delay compensated TOD information via multicasting or broadcasting, the TOD information of the time server can be continuously received without unselected terminals and the TOD gateway or the host PC exchanging the Time_Query and Time_Resp messages, and thus power consumption of each terminal is reduced.

The method of transmitting the delay compensated TOD information via multicasting or broadcasting may be used in a SOHO or home environment, where a wireless domain distance of a terminal receiving TOD information, and the a TOD gateway or a host PC adjusting and transmitting TOD information, is similar between each terminal.

Figure 9:
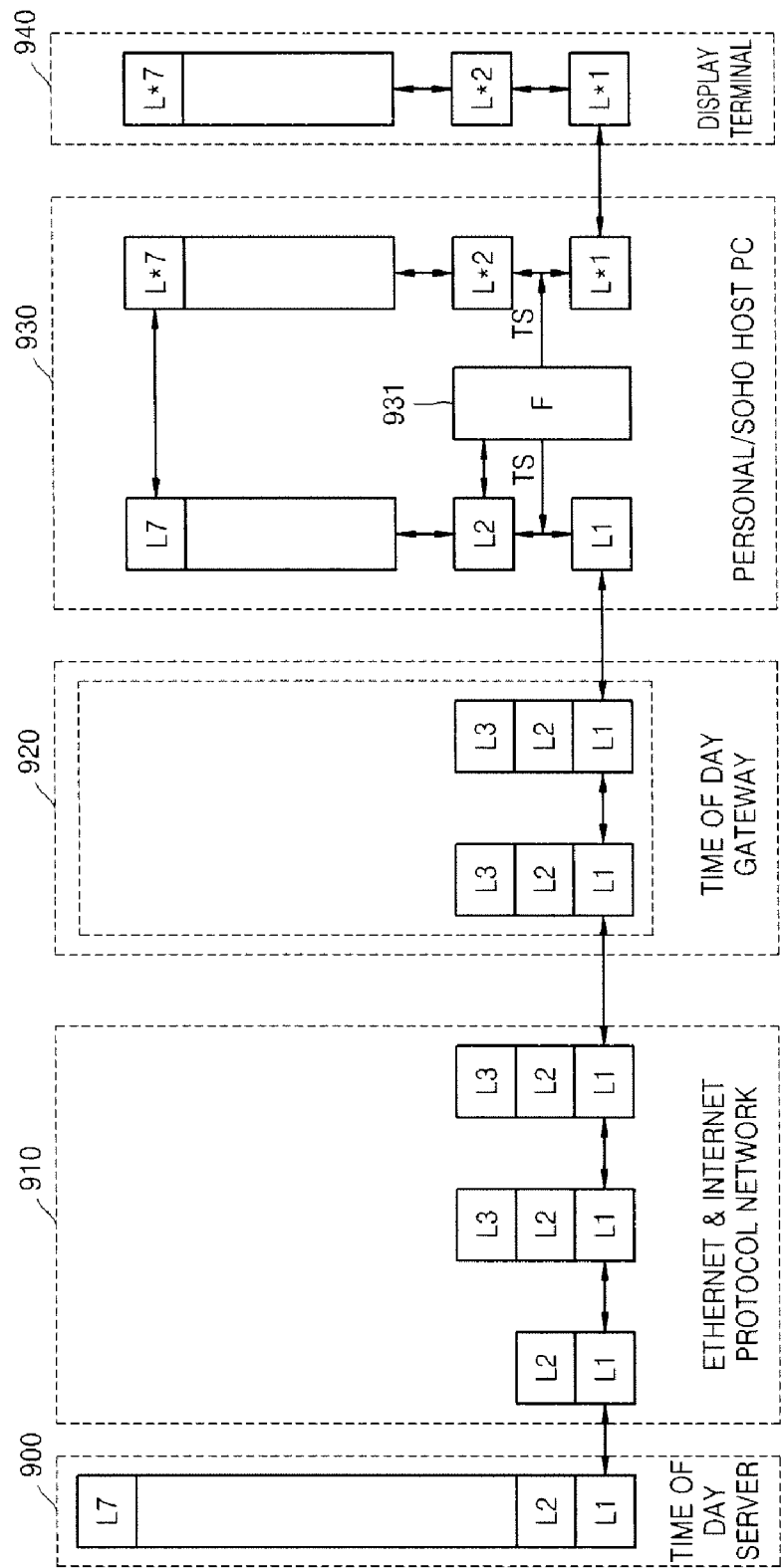
FIG. 9 is a diagram illustrating a structure for synchronizing a TOD of a time server and a display terminal, according to an embodiment of the present invention.

FIG. 9 is a diagram illustrating a structure for synchronizing a TOD of a time server 900 and a display terminal 940, according to an embodiment of the present invention.

TOD synchronization of the time server 900 and the display terminal 940 is performed by the time server 900, a TOD gateway 920, a host PC 930, and the display terminal 940.

The time server 900 and the display terminal 940 synchronizes TOD by using the NTP or PTP in a network 910.

By synchronizing the TOD of the time server 900 and the display terminal 940, power consumption of a display device is reduced by turning on or off a backlight of the display terminal 940 according to standard TOD received from the time server 900, thereby increasing durability of the display terminal 940.

Also, when the backlight of the display terminal 940 is separated according to a display zone, the backlight is turned on of off according to the display zone based on the standard TOD, and thus operations and power consumption of the display device are precisely adjusted.

The method and apparatus for synchronizing TOD of a terminal according to the present invention reduces an operation load of the terminal and simply and accurately synchronizes the TOD of a time server and the terminal.

Also, application software of the terminal may not be used, and thus the size and manufacturing costs of the terminal can be reduced.

In addition, a load of a TOD information processing operation of the terminal is reduced, and thus power consumption of the terminal can be reduced.

According to the method and apparatus in a convergent network, the terminal obtains TOD information of the time server periodically or when required, and thus highly precise TOD is maintained, and unnecessary data may not be received.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of synchronizing a time of day (TOD) of a terminal in a convergent network, the method comprising:
registering and storing identification information and TOD information of a terminal;
obtaining a first path delay time caused by a TOD synchronization message transmission path between the terminal and a TOD synchronization adjusting and storage unit that adjusts TOD synchronization of the terminal, and registers and stores the identification information and the TOD information;
obtaining a second path delay time caused by a TOD synchronization message transmission path between the TOD synchronization adjusting and storage unit and a time server providing a standard time;
obtaining delay compensated TOD information by applying the first path delay time and the second path delay time to the standard time;
converting the delay compensated TOD information to a form of TOD information of the terminal; and
transmitting the converted delay compensated TOD information to the terminal,
wherein when a plurality of terminals are connected to the TOD synchronization adjusting and storage unit, selecting one of the plurality of terminals, and multicasting and transmitting the delay compensated TOD information to the plurality of terminals.

2. The method of claim 1, wherein in the transmitting of the converted delay compensated TOD information, the converted delay compensated TOD information is transmitted from the TOD synchronization adjusting and storage unit to the terminal in a 3rd layer or lower in an open system interconnection (OSI) 7 layer model.

3. The method of claim 1, wherein the TOD synchronization adjusting and storage unit is a gateway or a host personal computer (PC).

4. The method of claim 1, wherein the time server and the TOD synchronization adjusting and storage unit transmit and receive a TOD synchronization message by using a network time protocol (NTP) or a precision timing protocol (PTP).

5. The method of claim 1, wherein in the converting of the delay compensated TOD information, the converting of the delay compensated TOD information according to a form of the registered and stored TOD information is limited to a terminal that is registered and stored in the TOD synchronization adjusting and storage unit.

6. The method of claim 1, wherein in the obtaining of the first path delay time, the first path delay time is measured periodically or when required.

7. The method of claim 1, wherein a network connecting the time server and the TOD synchronization adjusting and storage unit, and a network connecting the TOD synchronization adjusting and storage unit and the terminal are a heterogeneous network.

8. The method of claim 1, wherein in the multicasting and transmitting of the delay compensated TOD information, a period of multicasting the delay compensated TOD information is identical to a period of obtaining the first path delay time.

9. The method of claim 1, wherein the at least one of the plurality of terminals is a wireless terminal.

10. An apparatus for synchronizing a TOD of a terminal in a convergent network, the apparatus comprising:
a receiver that receives standard TOD information from a time server; and
a TOD synchronization adjusting and storage unit that registers and stores identification information and TOD information of a terminal, and transmits delay compensated TOD information in a form of the TOD information of the terminal by applying a delay time caused by a TOD synchronization message transmission path between the time server and the terminal to the standard TOD.

11. The apparatus of claim 10, wherein, when a plurality of terminals are connected to the TOD synchronization adjusting and storage unit, the TOD synchronization adjusting and storage unit selects one of the plurality of terminals, registers and stores identification information and TOD information of the plurality of terminals, stores delay compensated TOD information in a form of the TOD information of the selected terminal by applying a delay time caused by a TOD synchronization message transmission path between the time server and the selected terminal on the standard TOD, and multicasting and transmitting the delay compensated TOD information to the plurality of terminals.

12. The apparatus of claim 11, wherein a period of the TOD synchronization adjusting and storage unit multicasting the delay compensated TOD information is identical to a period of measuring the delay time.

13. The apparatus of claim 11, wherein at least one of the plurality of terminals is a wireless terminal.

14. The apparatus of claim 10, wherein the delay time caused by the TOD synchronization message transmission path between the time server and the terminal comprises a first path delay time caused by a TOD synchronization message transmission path between the TOD synchronization adjusting and storage unit and the terminal, and a second path delay time caused by a TOD synchronization message transmission path between the time server and the TOD synchronization adjusting and storage unit.

15. The apparatus of claim 10, wherein the TOD synchronization adjusting and storage unit transmits the delay compensated TOD information from the TOD synchronization adjusting and storage unit to the terminal in a 3rd layer or lower in an open system interconnection (OSI) 7 layer model.

16. The apparatus of claim 10, wherein the TOD synchronization adjusting and storage unit is a gateway or a host personal computer (PC).

17. The apparatus of claim 10, wherein the time server and the TOD synchronization adjusting and storage unit transmit and receive a TOD synchronization message by using a network time protocol (NTP) or a precision timing protocol (PTP).

18. The apparatus of claim 10, wherein the delay time caused by the TOD synchronization message transmission path between the time server and the terminal is measured periodically.

19. The apparatus of claim 10, wherein a network connecting the time server and the TOD synchronization adjusting and storage unit, and a network connecting the TOD synchronization adjusting and storage unit and the terminal are a heterogeneous network.

* * * * *